(12) United States Patent
Yang et al.

(10) Patent No.: US 12,348,363 B2
(45) Date of Patent: Jul. 1, 2025

(54) PROCESSING METHOD AND SERVICE TERMINAL OF SHARING DEVICE

(71) Applicant: Lenovo (Beijing) Limited, Beijing (CN)

(72) Inventors: Jacky Yang, Beijing (CN); Kehong Du, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 210 days.

(21) Appl. No.: 18/332,883

(22) Filed: Jun. 12, 2023

(65) Prior Publication Data
US 2023/0421434 A1    Dec. 28, 2023

(30) Foreign Application Priority Data

Jun. 27, 2022 (CN) .......................... 202210744130.0

(51) Int. Cl.
*H04L 41/0803* (2022.01)
*G06F 13/36* (2006.01)
*G06F 13/42* (2006.01)

(52) U.S. Cl.
CPC .......... *H04L 41/0803* (2013.01); *G06F 13/36* (2013.01); *G06F 13/4282* (2013.01)

(58) Field of Classification Search
CPC ... H04L 41/0803; G06F 13/36; G06F 13/4282
See application file for complete search history.

(56) References Cited

U.S. PATENT DOCUMENTS

2014/0173116 A1 * 6/2014 Kang ..................... H04L 67/10
709/226

FOREIGN PATENT DOCUMENTS

CA             3063498 A1 * 12/2019 ............. H04B 7/024

* cited by examiner

*Primary Examiner* — David E Martinez
(74) *Attorney, Agent, or Firm* — ANOVA LAW GROUP, PLLC (57) ABSTRACT

A method for processing shared device is applied to a service terminal, which includes a first and a second node. The method includes obtaining indication information of a first input terminal of the first node, determining whether the second node occupies a shared device based on the indication information of the first input terminal, and in response to determining that the second node does not occupy the shared device, adjusting indication information of a first output terminal of the first node to indicate the second node that the first node needs to occupy the shared device. The indication information of the first input terminal of the first node is consistent with indication information of a first output terminal of the second node. The indication information of the first output terminal of the first node is consistent with indication information of a first input terminal of the second node.

17 Claims, 7 Drawing Sheets

PROCESSING METHOD AND SERVICE TERMINAL OF SHARING DEVICE

CROSS-REFERENCE TO RELATED APPLICATION

This application claims priority to Chinese Patent Application No. 202210744130.0, filed on Jun. 27, 2022, the entire content of which is incorporated herein by reference.

TECHNICAL FIELD

The present disclosure relates to the server and service terminal field and, more particularly, to a processing method and a service terminal of a sharing device.

BACKGROUND

For a server with dual or more nodes, some shared devices that need to be shared among a plurality of nodes exist, such as inter-integrated circuit (I2C) elements, power supply units (PSU), or hard drive (HDD) backplanes. When two nodes need to read or write information of the shared devices, a problem of the plurality of nodes competing to use the shared devices would occur. If the plurality of nodes are not coordinated, the shared devices cannot be operated normally. To solve this problem, more shared devices are currently added to avoid usage competition, which increases manufacturing cost of the server.

SUMMARY

Embodiments of the present disclosure provide a shared device processing method applied to a service terminal, which includes a first node and a second node. The method includes obtaining indication information of a first input terminal of the first node, determining whether the second node occupies a shared device based on the indication information of the first input terminal of the first node, and in response to determining that the second node does not occupy the shared device, adjusting indication information of a first output terminal of the first node to indicate the second node that the first node needs to occupy the shared device. The indication information of the first input terminal of the first node is consistent with indication information of a first output terminal of the second node. The indication information of the first output terminal of the first node is consistent with indication information of a first input terminal of the second node.

Embodiments of the present disclosure provide a service terminal, including a first node and a second node interconnected with each other. The first input terminal of the first node is connected to a first output terminal of the second node to maintain indication information of the first input terminal of the first node and indication information of the first output terminal of the second node to be consistent. The indication information of the first input terminal of the first node is used to determine whether the second node occupies a shared device. The first output terminal of the first node is connected to a first input terminal of the second node to adjust indication information of the first output terminal of the first node in response to determining that the second node does not occupy the shared device to indicate the second node that the first node needs to occupy the shared device.

Embodiments of the present disclosure provide a service terminal, including a first node, a second node, one or more processors, and one or more memories. The one or more memories store instructions that, when executed by the one or more processors, cause the one or more processors to obtain indication information of a first input terminal of the first node, determine whether the second node occupies a shared device based on the indication information of the first input terminal of the first node, in response to determining that the second node does not occupy the shared device, adjust indication information of a first output terminal of the first node to indicate the second node that the first node needs to occupy the shared device. The indication information of the first input terminal of the first node is consistent with indication information of a first output terminal of the second node. The indication information of the first output terminal of the first node is consistent with indication information of a first input terminal of the second node.

DETAILED DESCRIPTION OF THE EMBODIMENTS

Various embodiments and features of the present disclosure are described in connection with the accompanying drawings.

Various modifications can be made to embodiments of the present disclosure. Thus, the present specification only illustrates examples of the present disclosure and is not intended to limit the present disclosure. Those skilled in the art can think of other modifications within the scope and spirit of the present disclosure.

The accompanying drawings included in the specification and forming a part of the specification illustrate embodiments of the present disclosure and are used to explain the principles of the present disclosure in conjunction with the general description provided above and the detailed description provided below.

By describing exemplary and non-limiting embodiments with reference to the accompanying drawings, these and other features of the present disclosure become obvious.

Although the present disclosure is described with reference to some embodiments, those skilled in the art can implement other equivalent forms of the present disclosure.

Embodiments of the present disclosure are described with reference to the accompanying drawings. However, embodiments of the present disclosure can be implemented in various manners. Well-known and/or repeated functions and structures are not described in detail to avoid unnecessary details obscuring the present disclosure. Thus, functional and structural details of the present disclosure are not intended to limit the present disclosure and are merely used as a basis for the claims, which teaches those skilled in the art to use the present disclosure with any suitable structures in various manners.

The phrases "in an embodiment," "in another embodiment," "in still another embodiment," or "in other embodiments" can be used to represent one or more of same or different embodiments of the present disclosure.

Embodiments of the present disclosure provide a shared device processing method, which is applied to a service terminal of a server. The server can at least include a plurality of nodes that can work individually. Each node of the plurality of nodes can call a shared device of the service terminal. The shared device can include some I2C elements, such as a first inter-integrated circuit (I2C) element of a power supply unit (PSU), a second I2C element of a hard drive (HDD) backplane, and a third I2C element.

In some embodiments, the server can include a first node and a second node. The first node and the second node can be connected by at least one connection line. Before the first node uses a shared device, first indication information at the first node may need to be checked. The first indication information can indicate a status of the second node. According to the first indication information, whether the second node occupies the shared device can be determined. After the first node occupies the shared device, second indication information can be generated at the first node. The second indication information can indicate the second node through the connection line to cause the second node to know that the first node occupies the shared device. Thus, the second node may not attempt to occupy the shared device to avoid an error.

Figure 1:
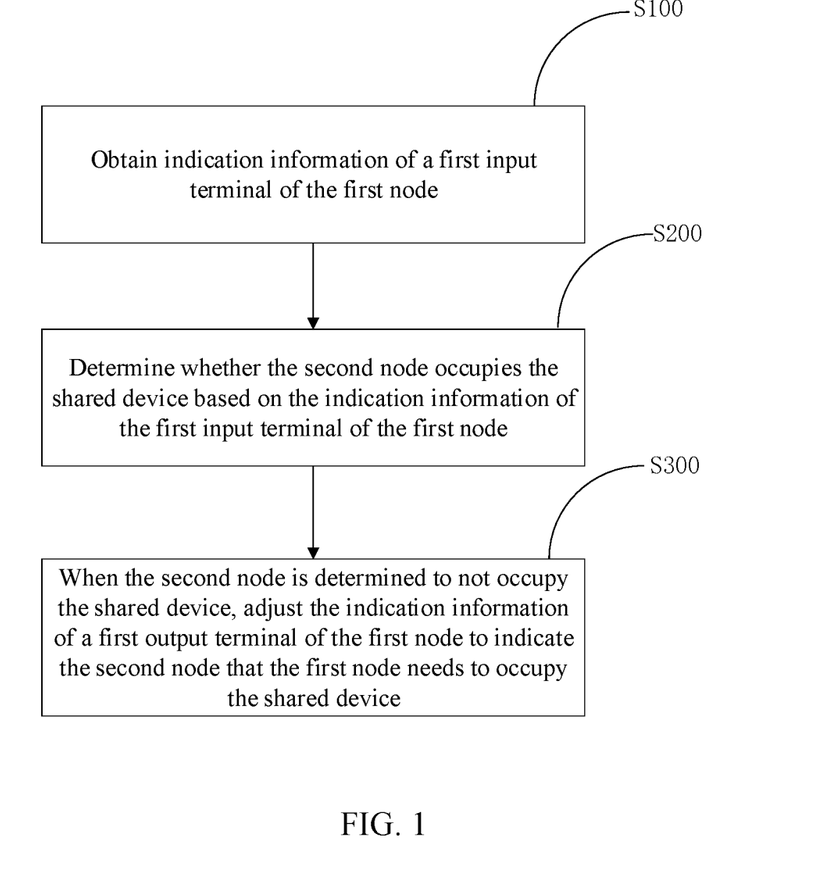
FIG. 1 illustrates a schematic flowchart of a processing method of a sharing device according to some embodiments of the present disclosure.

The shared device processing method is described in detail in connection with the accompanying drawings. FIG. 1 illustrates a schematic flowchart of a processing method of a sharing device according to some embodiments of the present disclosure. As shown in FIG. 1, the method includes the following processes.

At S100, indication information of a first input terminal of the first node is obtained. the indication information of the first input terminal of the first node remains consistent with indication information of a first output terminal of the second node.

Figure 5:
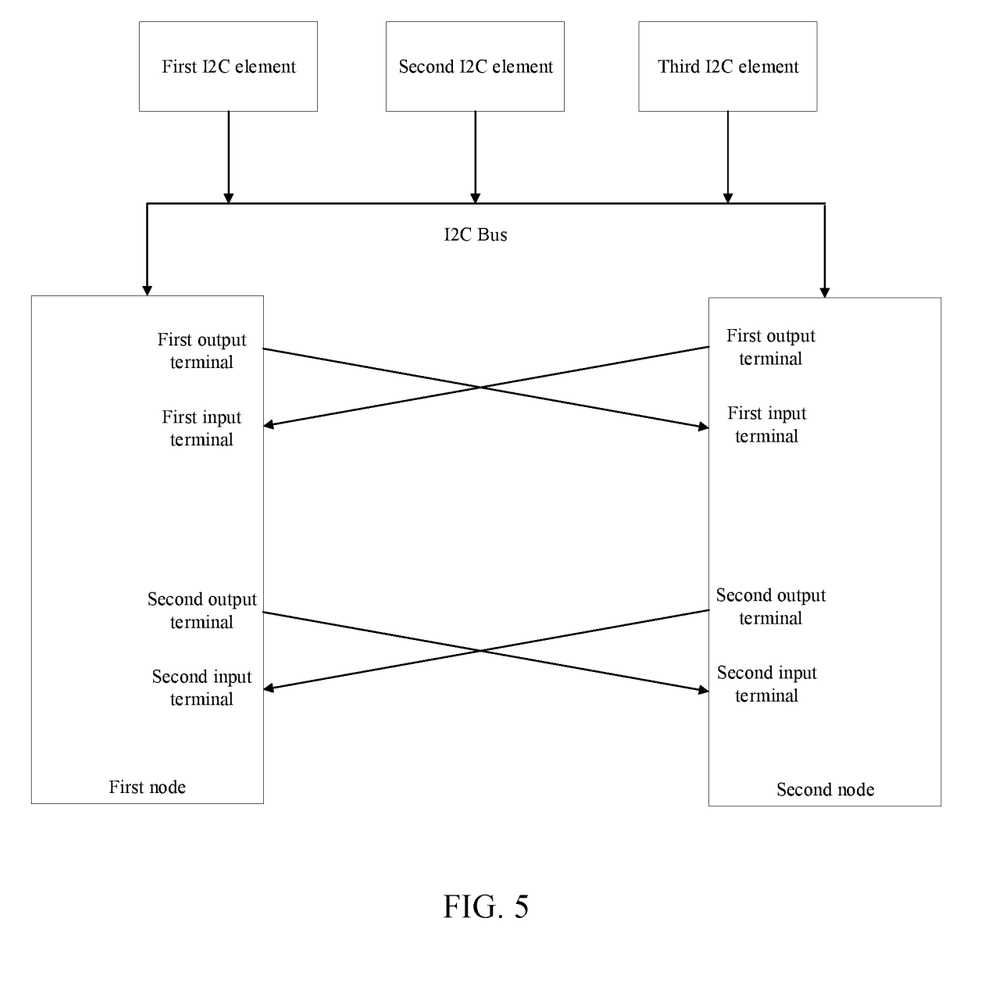
FIG. 5 illustrates a schematic diagram showing a connection relationship between a first node and a second node of a service terminal according to some embodiments of the present disclosure.

For example, as shown in FIG. 5, the first node and the second node of the service terminal of the server are independent devices. The first node and the second node can call the shared device individually. The shared device can include the first I2C element, the second I2C element, and the third I2C element. In some embodiments, the shared device can only be occupied by one node at a moment, and another node cannot occupy the shared device.

In some embodiments, the first node can include a first input terminal (e.g., GPIO A1 of the first node). The first input terminal can be connected to the second node. the first input terminal of the first node can be connected to the first output terminal of the second node. The second node can generate indication information for a situation where the shared device is occupied. The indication information can be output to the first input terminal of the first node through the first output terminal (e.g., GPIO A0 of the second node) of the second node.

The service terminal can read the first input terminal of the first node to obtain the indication information of the first input terminal of the first node.

At S200, whether the second node occupies the shared device is determined based on the indication information of the first input terminal of the first node.

In some embodiments, the indication information of the first input terminal of the first node can be used to indicate whether the second node occupies the shared device in a plurality of information representation manners, which can be a reference for subsequent actions of the first node. The subsequent actions can include that when the second node occupies the shared device, the first node can avoid competing to use the shared device.

In some embodiments, the indication information can represent whether the second node occupies the shared device through a high level or a low level. For example, the low level can indicate that the second node occupies the shared device, and the high level can indicate that the second node does not occupy the shared device.

For example, when the second node does not occupy the shared device, the second node can set the first output terminal of the second node to a high level. Since the first output terminal of the second node (GPIO A0) is connected to the first input terminal of the first node, the first input terminal of the first node can also be the high level. When the first input terminal is at a high level, the first node determines that the second node does not occupy the shared device. Thus, the first node can use the shared device.

In some other embodiments, the indication information can perform indication through a specific signal, e.g., a first signal having a first frequency and a second signal having a second frequency. When the indication information is the first signal, the second node can be determined to occupy the shared device. When the indication information is the second signal, the second node can be determined to not occupy the shared device.

At S300, when the second node is determined to not occupy the shared device, indication information of a first output terminal of the first node to indicate the second node that the first node needs to occupy the shared device. The indication information of the first output terminal of the first node (e.g., GPIO A0 of the first node) remains consistent with indication information of a first input terminal (e.g., GPIO A1 of the second node) of the second node.

For example, the first node can further include the first output terminal. The first output terminal of the first node can be connected to the first input terminal of the second node. Thus, the indication information of the first output terminal of the first node can remain consistent with the indication information of the first input terminal of the second node.

The first output terminal of the first node can be configured to indicate the second node with the indication information of whether the first node occupies the shared device. When determining that the second node does not occupy the shared device, the first node can adjust the indication information of the first output terminal.

For example, the first output terminal of the first node can be adjusted to a low level. Thus, the first input terminal of the second node can be used to indicate the second node. When determining that the first input terminal of the second node is at a low level, the second node can determine that the first node needs to occupy the shared device. Thus, the second node may no longer start an occupation process of the shared device to avoid a program error at the service terminal.

In some embodiments, the service terminal can include a plurality of other nodes. The plurality of other nodes can have an interaction and coordination manner among the plurality of other nodes, which can be similar to an interaction and coordination manner between the first node and the second node for occupying the shared device. Thus, the program error caused by competition for occupying the shared device can be avoided among the nodes of the service terminal of the server.

In the shared device processing method of embodiments of the present disclosure, through the coordination and control between the existing devices of the service terminal, the nodes of the service terminal may not conflict with each other due to occupying the shared device. Thus, the program error at the service terminal can be avoided by ensuring the manufacturing cost of the server.

Figure 2:
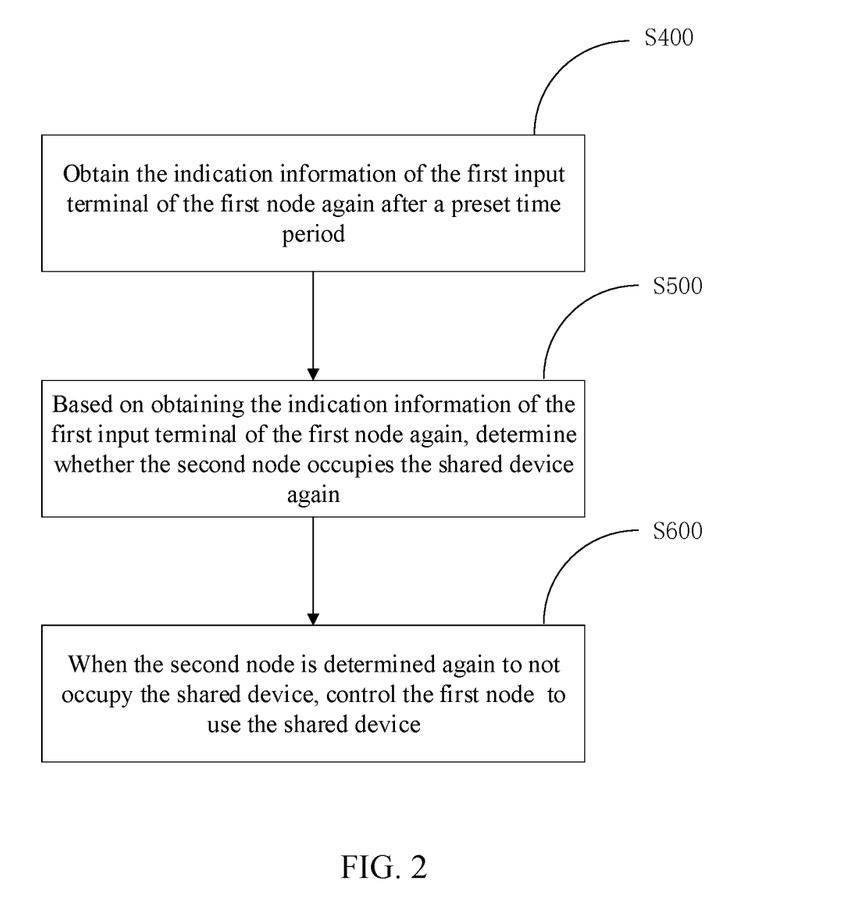
FIG. 2 illustrates a schematic flowchart of another processing method of a sharing device according to some embodiments of the present disclosure.

In embodiments of the present disclosure, as shown in FIG. 2, after adjusting the indication information of the first output terminal of the first node when the second node is determined to not occupy the shared device, the method further includes the following processes.

At S400, the indication information of the first input terminal of the first node is obtained again after a preset time period.

For example, a process of the second node occupying the shared device cannot be finished for instance. In some embodiments, when the second node is reading and writing the shared device, the second node may not send the indication information to the first node through the first output terminal of the second node in time. For example, the first input terminal of the first node may not be changed to the low level in time, and the first input terminal of the first node can still be at the high level. However, the second node is occupying the shared device at the moment. Thus, in some embodiments, the first node may need to set the indication information of the first output terminal of the first node to indicate the second node that the first node needs to occupy the shared device. After the preset time period, the first node can obtain the indication information of the first input terminal of the first node again. Thus, whether the second node occupies or is occupying the shared device can be determined more accurately.

Figure 6:
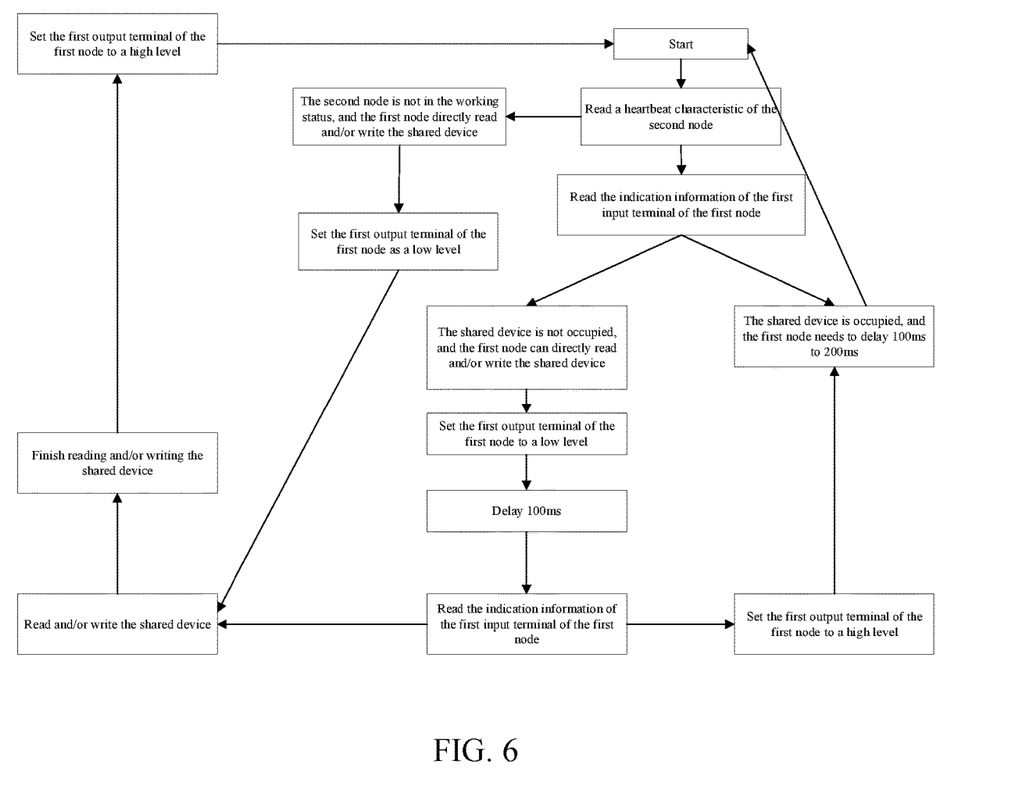
FIG. 6 illustrates a schematic flowchart of a processing method according to some embodiments of the present disclosure.

For example, as shown in FIG. 6, the first node sets the first output terminal of the first node to the low level to indicate the second node that the first node needs to occupy the shared device. The first node obtains the indication information of the first input terminal of the first node again after waiting for 100 ms. If the first input terminal of the first node is still at a high level, the first node can accurately determine that the second node does not occupy or is not occupying the shared device.

At S500, based on obtaining the indication information of the first input terminal of the first node again, whether the second node occupies the shared device can be determined again.

For example, after obtaining the indication information of the first input terminal of the first node, the first node can be configured to analyze the indication information to determine whether the indication information is a high level or a low level, or whether the indication information is the first signal or the second signal. For example, if the first input terminal of the first node is still at the high level after the above waiting time of 100 ms, the second node can be determined to not occupy or be not occupying the shared device. If the first input terminal of the first node is at the low level after the above waiting time of 100 ms, the second node can be determined to be occupying the shared device. Thus, the first node can be controlled to not start the occupation process of the shared device and to avoid the error of competing for the shared device.

At S600, when the second node is determined again to not occupy the shared device, the first node is controlled to use the shared device.

In some embodiments, the first node can determine that the second node does not occupy the shared device by analyzing the indication information of the first input terminal of the first node. Then, the first node can be controlled to use the shared device, and the indication information of the first output terminal of the first node can be set. For example, the first output terminal of the first node can be set to a low level. According to the connection relationship between the first output terminal of the first node and the first input terminal of the second node, the first input terminal of the second node can be used to indicate the second node that the first node occupies the shared device.

In embodiments of the present disclosure, based on the indication information of the first input terminal of the first node, the second node can be determined to occupy the shared device. Thus, the first node can abandon an operation of reading and/or writing the shared device and set the indication information of the first output terminal of the first node.

In some embodiments, the first node can obtain the indication information of the first input terminal of the first node and analyze the indication information according to a predetermined regulation. Whether the second node occupies the shared device can be determined according to the analysis result. If the second node is determined to occupy the shared device, to avoid the competing error, the first node can be controlled to abandon the operation of reading and/or writing the shared device.

In addition, the first output terminal of the first node can be connected to the first input terminal of the second node. Thus, the indication information of the first output terminal of the first node can be consistent with the indication information of the first input terminal of the second node. After setting the indication information of the first output terminal of the first node, an indication can be provided to the second node.

For example, the first node can set the first output terminal of the first node to a high level to indicate the second node that the first node abandons the operation of reading and/or writing the shared device. After reading the indication information of the first input terminal of the second node, the second node can safely use the shared device.

In some embodiments, as shown in FIG. 6, after controlling the first node to abandon the operation of reading and/or writing the shared device, after a random waiting time (such as 100 ms to 200 ms), a probability of competing with another node again can be reduced, and a read/write cycle for the first input terminal and the first output terminal can be waited for.

In some embodiments of the present disclosure, after controlling the first node to use the shared device when the second node is determined again to not occupy the shared device, the method can further include setting the indication information of the first output terminal of the first node after the first node finishes using the shared device to indicate the second node that the shared device has been used by the first node.

In some embodiments, the indication information of the first output terminal of the first node can be consistent with the indication information of the first input terminal of the second node. The first node can notify the second node with the status information of using the shared device of the first node, which includes sending the related content that the first node finishes using the shared device to the second node. for example, the first output terminal of the first node can be set to a high level to cause the first input terminal of the second node to be indicated as the high level. Thus, after reading the indication information of the first input terminal of the second node, the second node can determine that the first node no longer uses the shared device. The second node can start the process of occupying the shared device.

In embodiments of the present disclosure, the first node can further include a second input terminal and a second output terminal, and the second node can also include a second input terminal and a second output terminal. The second input terminal of the first node can be connected to the second input terminal of the second node, and the second output terminal of the first node can be connected to the second input terminal of the second node. Thus, indication information of the second input terminal of the first node can be consistent with indication information of the second output terminal of the second node. Indication information of the second output terminal of the first node can be consistent with indication information of the second input terminal of the second node.

Figure 3:
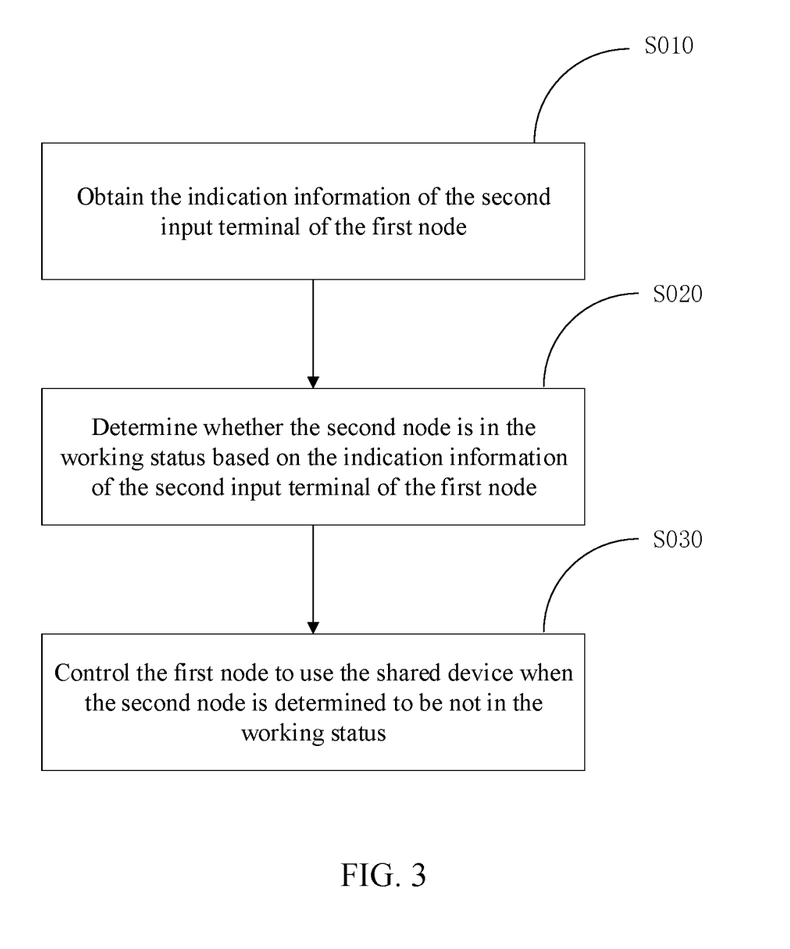
FIG. 3 illustrates a schematic flowchart of another processing method of a sharing device according to some embodiments of the present disclosure.

Based on the above content, before obtaining the indication information of the first input terminal of the first node, as shown in FIG. 3, the method further includes the following processes.

At S010, the indication information of the second input terminal of the first node is obtained. The indication information of the second input terminal of the first node is consistent with the indication information of the second output terminal of the second node.

In some embodiments, the indication information of the second input terminal of the first node can be used to indicate the current status of the second node, including whether the second node is in a working status or not in the working status. The working status can refer to a status in which the second node is working when the second node does not occupy the shared device. The second node in the working status can request to occupy the shared device. Not in the working status can refer to a status in which the second node is not working when the second node still does not occupy the shared device, e.g., a crash status or an error status. The second node that is not in the working status cannot start the request to occupy the shared device.

The indication information of the second input terminal of the first node can be obtained, and the indication information can be analyzed according to the predetermined regulation. Thus, whether the second node is in the working status can be determined according to the indication information.

At S020, whether the second node is in the working status is determined based on the indication information of the second input terminal of the first node.

In some embodiments, after obtaining the indication information, the first node can analyze the indication information to determine the indicated content according to the predetermined regulation, e.g., to determine whether the indication information is high level or low level. When the second input terminal of the first node is at a high level, the second node can be determined to be not in the working status. When the second input terminal of the first node is at a low level, the second node can be determined to be in the working status. Then, specific meanings represented by the high level or low level at the second input terminal of the first node can be adjusted as needed, which are not limited here.

At S030, the first node is controlled to use the shared device when the second node is determined to be not in the working status.

For example, As shown in FIG. 6, on one aspect, if the second node is not in the working status, the second node is determined to not occupy the shared device. For example, if the second node is in a crashed status or a repair status, the second node may not need to occupy the shared device. The first node can be configured to determine that the second node is not in the working status. Thus, the first node can directly use the shared device, and whether the second node occupies the shared device may not need to be determined again. Thus, the processing time can be saved, and the efficiency of using the shared device can be improved.

On another aspect, if the second node is determined to be in the working status, the second node can be indicated to possibly use the shared device. Thus, the first node cannot directly start the process of occupying the shared device but can determine whether the second node occupies the shared device. Based on the above, whether the second node occupies the shared device can be determined through the indication information of the first input terminal of the first node. Thus, the conflict caused by the competition for the shared device between the first node and the second node can be avoided.

Figure 4:
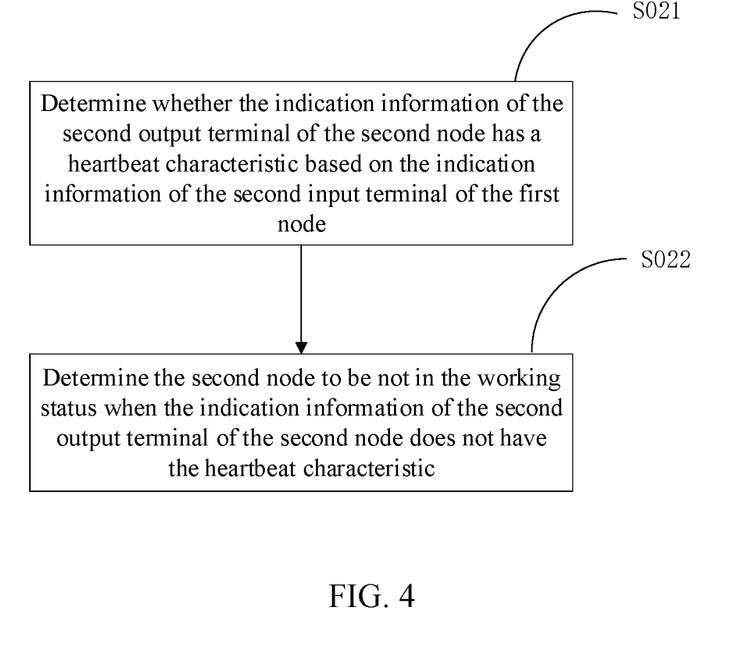
FIG. 4 illustrates a schematic flowchart showing process S020 in FIG. 3.

In embodiments of the present disclosure, as shown in FIG. 4, determining whether the second node is in the working status based on the indication information of the second input terminal of the first node includes the following processes.

At S021, whether the indication information of the second output terminal of the second node has a heartbeat characteristic is determined based on the indication information of the second input terminal of the first node.

At S022, the second node is determined to be not in the working status when the indication information of the second output terminal of the second node does not have the heartbeat characteristic.

In some embodiments, as shown in FIG. 5 and FIG. 6, the heartbeat characteristic can be represented by an interval change of a signal. For example, the heartbeat characteristic can be represented by an alternating change between the high level and the low level. For example, the second output terminal of the second node can change once between the high level and the low level every second. Thus, the heartbeat characteristic of the second node can be represented. If the second output terminal of the second node does not have the heartbeat characteristic, or the heartbeat characteristic has an error, a flag position of the heartbeat characteristic of the second node can be set to "false." Then, the second input terminal of the first node can obtain related information through the connection relationship between the second input terminal of the first node and the second output terminal of the second node to determine that the second node does not have the heartbeat characteristic. Further, the second node can be determined to be not in the working status.

On the contrary, if the second output terminal of the second node has the heartbeat characteristic, and/or the heartbeat characteristic does not have the error, the flag position of the heartbeat characteristic of the second node can be set to "true." The second input terminal of the first node can obtain the related information through the connection relationship between the second input terminal of the first node and the second output terminal of the second node. Then, the second node can be determined to have the heartbeat characteristic. Further, the second node can be determined to be in the working status.

In some embodiments, controlling the first node to use the shared device when the second node is determined to be not in the working status can include adjusting the indication information of the first output terminal of the first node when the second node is determined to be not in the working status to indicate the second node that the first node needs to occupy the shared device.

In some embodiments, when the first node determines that the second node is not in the working status based on the indication information of the second input terminal of the first node, the first node can directly use the shared device. The first output terminal of the first node can be adjusted. For example, the first output terminal of the first node can be adjusted to a low level. Thus, through the connection between the first output terminal of the first node and the first input terminal of the second node, the second node can be indicated that the first node needs to occupy the shared device. Therefore, even if the second node is in the working status, the second node can no longer request to use the shared device, which avoids the conflict caused by the competition in using the shared device.

In embodiments of the present disclosure, the indication information of the first input terminal of the first node and the indication information of the first output terminal of the first node can be represented by a high level or a low level. The indication information of the first input terminal of the second node and the indication information of the first output terminal of the second node can be represented by a high level or a low level. Specific meanings of the low level and the high level can be preset according to an application scenario or adjusted as needed.

In addition, the indication information can also be represented by another form of information. For example, signals of different frequencies can be used to indicate different contents, or different signal waves can be used to indicate different contents, which can be used flexibly according to the application scenario of the method.

Based on the same concept, embodiments of the present disclosure further provide a service terminal. The service terminal can be a server. As shown in FIG. 5, the service terminal includes the first node and the second node connected to each other.

The first input terminal of the first node can be connected to the first output terminal of the second node to ensure that the indication information of the first input terminal of the first node is consistent with the indication information of the first output terminal of the second node. The indication information of the first input terminal of the first node can be used to determine whether the second node occupies the shared device.

In some embodiments, the first node and the second node of the server such as the service terminal can be independent devices and can call the shared device independently. In some embodiments, the shared device can only be occupied by one node at a same moment, and another node cannot occupy the shared device.

In some embodiments, the first node can include the first input terminal. The first input terminal can be connected to the second node. The first input terminal of the first node can be connected to the first output terminal of the second node. The second node can generate the indication information for whether the second node occupies the shared device. The indication information can be output to the first input terminal of the first node through the first output terminal of the second node.

The service terminal can read the first input terminal of the first node to obtain the indication information of the first input terminal of the first node.

The indication information of the first input terminal of the first node can indicate whether the second node occupies the shared device through a plurality of information representation manners to serve as a reference for the subsequent actions of the first node. For example, when the second node occupies the shared device, the first node can avoid competition in using the shared device.

In some embodiments, the indication information can represent whether the second node occupies the shared device through the high level or the low level. For example, the low level can represent that the second node occupies the shared device, and the high level can represent that the second node does not occupy the shared device.

For example, when the second node does not occupy the shared device, the second node can set the first output terminal of the second node to a high level. Since the first output terminal of the second node is connected to the first input terminal of the first node, the first input terminal of the first node can also be at a high level. When determining that the first input terminal of the first node is at a high level, the first node can determine that the second node does not occupy the shared device. Therefore, the first node can use the shared device.

In some other embodiments, the indication information can perform indication through a specific signal, e.g., a first signal having a first frequency and a second signal having a second frequency. When the indication information is the first signal, the second node can be determined to occupy the shared device. When the indication information is the second signal, the second node can be determined to not occupy the shared device.

The first output terminal of the first node can be connected to the first input terminal of the second node. Thus, when the second node is determined to not occupy the shared device, the second node can be indicated that the first node needs to occupy the shared device by adjusting the indication information of the first output terminal of the first node.

In some embodiments, the first node can further include the first output terminal. The first output terminal of the first node can be connected to the first input terminal of the second node. Thus, the indication information of the first output terminal of the first node and the indication information of the first input terminal of the second node can be consistent.

The first output terminal of the first node can be configured to provide the indication information of whether the first node occupies the shared device to the second node. When the first node determines that the second node does not occupy the shared device, the first node can adjust the indication information of the first output terminal of the first node.

For example, the first output terminal of the first node can be adjusted to a low level to indicate the second node through the first input terminal of the second node. When determining that the first input terminal of the second node is at a low level, the second node can determine that the first node needs to occupy the shared device. Thus, the second node can no longer start the process of occupying the shared device. Thus, the program effort can be avoided at the service terminal.

In addition, in some embodiments, the server may include the plurality of other nodes. The plurality of other nodes can have the interaction and coordination manner among the plurality of other nodes, which can be similar to an interaction and coordination manner between the first node and the second node for occupying the shared device. Thus, the program error caused by competition for occupying the shared device can be avoided among the nodes of the service terminal of the server.

In embodiments of the present disclosure, the first node can be further configured to obtain the indication information of the first input terminal of the first node again after the preset time period, determine whether the second node occupies the shared device again based on indication information of the first input terminal of the first node obtained again, and control the first node to use the shared device when the second node is determined again to not occupy the shared device.

In embodiments of the present disclosure, the first node can be further configured to control the first node to abandon the operation of reading and/or writing the shared device when the second node is determined to occupy the shared device based on the indication information of the first input terminal of the first node and set the indication information of the first output terminal of the first node.

In embodiments of the present disclosure, the first node can be further configured to set the indication information of the first output terminal of the first node when the first node finishes using the shared device to indicate the second node that the shared device has been used by the first node.

In embodiments of the present disclosure, the first node can be further configured to obtain the indication information of the second input terminal of the first node, the indication information of the second input terminal of the first node being consistent with the indication information of the second output terminal of the second node, determine whether the second node is in the working status based on the indication information of the second input terminal of the first node, and control the first node to use the shared device when the second node is determined to be not in the working status.

In embodiments of the present disclosure, the first node can be further configured to determine whether the indication information of the second node has the heartbeat characteristic through the indication information of the second input terminal of the first node and determine that the second node is not in the working status when the indication information of the second output terminal of the second node is determined to not have the heartbeat characteristic.

In embodiments of the present disclosure, the first node can be further configured to adjust the indication information of the first output terminal of the first node when the second node is determined to be not in the working status to indicate the second node that the first node needs to occupy the shared device.

In embodiments of the present disclosure, the indication information of the first input terminal of the first node and the indication information of the first output terminal of the first node can be represented by a high level or a low level. The indication information of the first input terminal of the second node and the indication information of the first output terminal of the second node can be represented by a high level or a low level.

Figure 7:
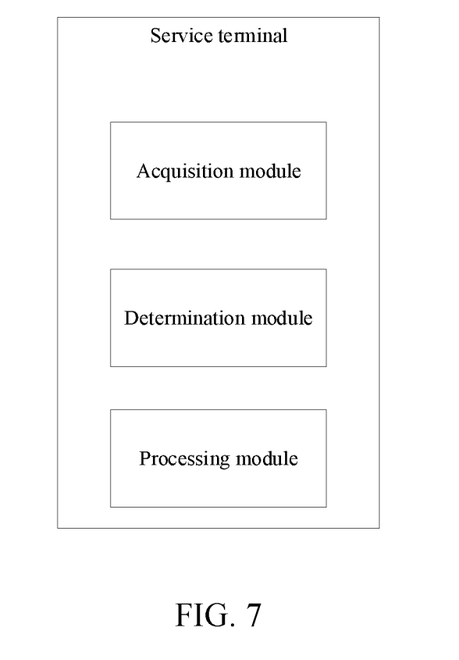
FIG. 7 illustrates a schematic structural diagram of a service terminal according to some embodiments of the present disclosure.

Based on the same concept, embodiments of the present disclosure further provide another service terminal. As shown in FIG. 7, the service terminal includes an acquisition module, a determination module, and a processing module.

The acquisition module can be configured to obtain the indication information of the first input terminal of the first node. The indication information of the first input terminal of the first node can be consistent with the indication information of the first output terminal of the second node.

The determination module can be configured to determine whether the second node occupies the shared device based on the indication information of the first input terminal of the first node.

The processing module can be configured to adjust the indication information of the first output terminal of the first node when the second node is determined to not occupy the shared device to indicate the second node that the first node needs to occupy the shared device. The indication information of the first output terminal of the first node can be consistent with the indication information of the first input terminal of the second node.

In embodiments of the present disclosure, the acquisition module can be further configured to obtain the indication information of the first input terminal of the first node again after the predetermined time period.

Correspondingly, the determination module can be further configured to determine whether the second node occupies the shared device again based on the indication information of the first input terminal of the first node obtained again.

Correspondingly, the processing module can be further configured to control the first node to use the shared device when the second node is determined to not occupy the shared device again.

In embodiments of the present disclosure, the processing module can be further configured to control the first node to abandon the operation of reading and/or writing the shared device when the second node is determined to have occupied the shared device based on the indication information of the first input terminal of the first node and set the indication information of the first output terminal of the first node.

In embodiments of the present disclosure, the processing module can be further configured to set the indication information of the first output terminal of the first node when the first node finishes using the shared device to indicate the second node that the shared device has been used by the first node.

In embodiments of the present disclosure, the acquisition module can be further configured to obtain the indication information of the second input terminal of the first node. The indication information of the second input terminal of the first node can be consistent with the indication information of the second output terminal of the second node.

Correspondingly, the determination module can be further configured to determine whether the second node is in the working status based on the indication information of the second input terminal of the first node.

Correspondingly, the processing module can be further configured to control the first node to use the shared device when the second node is determined to be not in the working status.

In embodiments of the present disclosure, the determination module can be further configured to determine whether the indication information of the second output terminal of the second node has the heartbeat characteristic through the indication information of the second input terminal of the first node and determine that the second node is not in the working status when the indication information of the second output terminal of the second node is determined to have no heartbeat characteristic.

In embodiments of the present disclosure, the processing module can be further configured to adjust the indication information of the first output terminal of the first node when the second node is determined to be not in the working status to indicate the second node that the first node needs to occupy the shared device.

In embodiments of the present disclosure, the indication information of the first input terminal of the first node and the indication information of the first output terminal of the first node can be represented by a high level or a low level. The indication information of the first input terminal of the second node and the indication information of the first output terminal of the second node can be represented by a high level or a low level.

The above embodiments are merely some embodiments of the present disclosure and are not intended to limit the present disclosure. The scope of the present invention is subject to the appended claims. Those skilled in the art can make various modifications or equivalent replacements to the present disclosure within the essence and scope of the present disclosure. These modifications and equivalent replacements are within the scope of the present disclosure.

What is claimed is:

1. A method for processing shared device, applied to a service terminal including at least a first node and a second node, comprising:
   obtaining indication information of a first input terminal of the first node, the indication information of the first input terminal of the first node being consistent with indication information of a first output terminal of the second node;
   determining whether the second node occupies a shared device based on the indication information of the first input terminal of the first node; and
   in response to determining that the second node does not occupy the shared device, adjusting indication information of a first output terminal of the first node to indicate the second node that the first node needs to occupy the shared device, the indication information of the first output terminal of the first node being consistent with indication information of a first input terminal of the second node.

2. The method according to claim 1, further comprising, after adjusting the indication information of the first output terminal of the first node in response to determining that the second node does not occupy the shared device:
   obtaining the indication information of the first input terminal of the first node again after a predetermined time period;
   determining whether the second node occupies the shared device again based on the indication information obtained again from the first input terminal of the first node; and
   controlling the first node to use the shared device in response to determining again that the second node does not occupy the shared device.

3. The method according to claim 1, further comprising:
   in response to determining that the second node occupies the shared device based on the indication information of the first input terminal of the first node, controlling the first node to abandon an operation of reading and/or writing the shared device and setting the indication information of the first output terminal of the first node.

4. The method according to claim 2, further comprising, after controlling the first node to use the shared device in response to determining that the second node does not occupy the shared device again:
   in response to the first node finishing using the shared device, setting the indication information of the first output terminal of the first node to indicate the second node that the first node finishes using the shared device.

5. The method according to claim 1, further comprising, before obtaining the indication information of the first input terminal of the first node:
   obtaining indication information of a second input terminal of the first node, the indication information of the second input terminal of the first node being consistent with indication information of a second output terminal of the second node;
   determining whether the second node is in a working status based on the indication information of the second input terminal of the first node; and
   controlling the first node to use the shared device in response to determining that the second node is not in the working status.

6. The method according to claim 5, wherein determining whether the second node is in the working state based on the indication information of the second input terminal of the first node includes:
   determining whether indication information of a second output terminal of the second node has a heartbeat characteristic through the indication information of the second input terminal of the first node; and
   in response to determining that the indication information of the second output terminal of the second node does not have the heartbeat characteristic, determining that the second node is not in the working status.

7. The method according to claim 5, wherein controlling the first node to use the shared device in response to determining that the second node is not in the working status includes:
   in response to determining that the second node is not in the working status, adjusting the indication information of the first output terminal of the first node to indicate the second node that the first node needs to occupy the shared device.

8. The method according to claim 1, wherein:
   the indication information of the first input terminal and the indication information of the first output terminal of the first node are represented by a high level or a low level; and
   the indication information of the first input terminal and the indication information of the first output terminal of the second node are represented by a high level or a low level.

9. A service terminal comprising a first node and a second node interconnected with each other, wherein:
   a first input terminal of the first node is connected to a first output terminal of the second node to maintain indication information of the first input terminal of the first node and indication information of the first output terminal of the second node to be consistent, the indication information of the first input terminal of the first node being used to determine whether the second node occupies a shared device; and
   a first output terminal of the first node is connected to a first input terminal of the second node to adjust indication information of the first output terminal of the first node in response to determining that the second node does not occupy the shared device to indicate the second node that the first node needs to occupy the shared device.

10. A service terminal comprising:
    a first node;
    a second node;
    one or more processors; and one or more memories storing instructions that, when executed by the one or more processors, cause the one or more processors to:
- obtain indication information of a first input terminal of the first node, the indication information of the first input terminal of the first node being consistent with indication information of a first output terminal of the second node;
- determine whether the second node occupies a shared device based on the indication information of the first input terminal of the first node; and
- in response to determining that the second node does not occupy the shared device, adjust indication information of a first output terminal of the first node to indicate the second node that the first node needs to occupy the shared device, the indication information of the first output terminal of the first node being consistent with indication information of a first input terminal of the second node.

11. The service terminal according to claim 10, wherein the one or more processors are configured to:
- obtain the indication information of the first input terminal of the first node again after a predetermined time period;
- determine whether the second node occupies the shared device again based on the indication information obtained again from the first input terminal of the first node; and
- control the first node to use the shared device in response to determining again that the second node does not occupy the shared device.

12. The service terminal according to claim 10, wherein the one or more processors are configured to:
- in response to determining that the second node occupies the shared device based on the indication information of the first input terminal of the first node, control the first node to abandon an operation of reading and/or writing the shared device and set the indication information of the first output terminal of the first node.

13. The service terminal according to claim 11, wherein the one or more processors are configured to:
- in response to the first node finishing using the shared device, set the indication information of the first output terminal of the first node to indicate the second node that the first node finishes using the shared device.

14. The service terminal according to claim 10, wherein the one or more processors are configured to:
- obtain indication information of a second input terminal of the first node, the indication information of the second input terminal of the first node being consistent with indication information of a second output terminal of the second node;
- determine whether the second node is in a working status based on the indication information of the second input terminal of the first node; and
- control the first node to use the shared device in response to determining that the second node is not in the working status.

15. The service terminal according to claim 14, wherein the one or more processors are configured to:
- determine whether indication information of a second output terminal of the second node has a heartbeat characteristic through the indication information of the second input terminal of the first node; and
- in response to determining that the indication information of the second output terminal of the second node does not have the heartbeat characteristic, determine that the second node is not in the working status.

16. The service terminal according to claim 14, wherein the one or more processors are configured to:
- in response to determining that the second node is not in the working status, adjust the indication information of the first output terminal of the first node to indicate the second node that the first node needs to occupy the shared device.

17. The service terminal according to claim 10, wherein:
- the indication information of the first input terminal and the indication information of the first output terminal of the first node are represented by a high level or a low level; and
- the indication information of the first input terminal and the indication information of the first output terminal of the second node are represented by a high level or a low level.

* * * * *